United States Patent [19]

Hein et al.

[11] Patent Number: 5,730,565
[45] Date of Patent: Mar. 24, 1998

[54] ANCHOR BOLT FOR ANCHORING WITH COMPOUND MASS

[75] Inventors: Bernd Hein, Freudenstadt; Willi Haug, Freudenstadt-Musbach, both of Germany

[73] Assignee: fischerwerke, Artur Fischer GmbH & Co. K.G., Waldachtal, Germany

[21] Appl. No.: 551,851

[22] Filed: Nov. 7, 1995

[30] Foreign Application Priority Data

Nov. 8, 1994 [DE] Germany .................. 44 39 861.1

[51] Int. Cl.⁶ ............................................ F16B 39/02
[52] U.S. Cl. .................. 411/82; 411/258; 411/930; 405/259.5
[58] Field of Search ........................ 405/259.1–259.6; 411/82, 166, 175, 258, 930

[56] References Cited

U.S. PATENT DOCUMENTS

| | | | |
|---|---|---|---|
| 3,901,319 | 8/1975 | Staley et al. | 405/259.6 |
| 4,704,053 | 11/1987 | Hipkins, Sr. et al. | 405/259.6 |
| 5,032,046 | 7/1991 | Fischer | 411/82 |
| 5,054,146 | 10/1991 | Wiesenfeld et al. | 405/259.6 |
| 5,104,266 | 4/1992 | Daryoush et al. | 411/82 |
| 5,273,377 | 12/1993 | Taylor | 405/259.6 |

FOREIGN PATENT DOCUMENTS

| | | | |
|---|---|---|---|
| 3238751 | 4/1984 | Germany. | |
| 8809574 | 7/1988 | Germany. | |
| 3718158 | 12/1988 | Germany. | |
| 4033396 | 5/1991 | Germany. | |
| 4221853 | 7/1992 | Germany. | |
| 4204214 | 8/1993 | Germany. | |
| 2034850 | 6/1980 | United Kingdom | 405/259.6 |

*Primary Examiner*—Steven N. Meyers
*Assistant Examiner*—Tuyet-Phuong Pham
*Attorney, Agent, or Firm*—Michael J. Striker

[57] ABSTRACT

An anchor bolt for anchoring with a compound mass in a hole drilled in a building component comprises a bolt element having a leading end and a rear end, elements for fixing an article at the rear end, and a mixing attachment arranged at the leading end of the bolt element and having a point. The mixing attachment has an outer surface provided with a plurality of radially projecting lugs which are arranged circumferentially and axially spaced from one another.

6 Claims, 1 Drawing Sheet

ANCHOR BOLT FOR ANCHORING WITH COMPOUND MASS

BACKGROUND OF THE INVENTION

The present invention relates to an anchor bolt, in particular for anchoring by means of a compound mass in a hole drilled in a building component.

Anchor bolts of the above mentioned general type are known in the art. The known anchor bolts for anchoring with a compound mass in a hole drilled in a building component are usually formed as a threaded rod with a leading end provided with a tapered point and a rear end having a driver member. The threaded rod is driven by a drilling machine into a drilled hole, into which the compound mass has been introduced by a glass capsule. The tapered point crushes the glass capsule and at the same time the compound mass including two components is mixed in the drilled hole by the rotary movement of the anchor bolt. In order to provide satisfactory mixing of the components in the drilled hole the anchor bolt has to be rotated for a considerable time. Furthermore, when the mounting is performed with the use of a drilling machine, appropriate measures on the anchor bolt and the driving-in tools are necessary to transfer torque from the drilling machine to the anchor bolt.

SUMMARY OF THE INVENTION

Accordingly, it is an object of the present invention to provide an anchor bolt of the above-mentioned type, which avoids the disadvantages of the prior art.

In keeping with these objects and with others which will become apparent hereinafter, one feature of the present invention resides, briefly stated, an anchor bolt which is provided with a mixing attachment arranged at the leading end of the anchor bolt and having a point, wherein the mixing attachment has an outer surface provided with radially projecting lugs arranged in rings so as to be circumferentially and axially spaced from one another.

When the anchoring bolt is designed in accordance with the present invention is used with a compound mortar which provides fixing combined with high holding values and short hardening times, the anchoring can be performed in a simple manner by impact because of the good mixing of the compound mass.

In the anchor bolt in accordance with the present invention, the radially projecting lugs arranged in rings on the outer surface of the mixing attachment and axially spaced from one another, provide interconnected spaces between the outer surface of the mixing attachment and the wall of the drilled hole, in which the compound mass can rise as the anchor bolt is driven in. The compound mass builds up at the leading front faces of the lugs as it rises, so that by flowing around the lugs the components of the compound mass are mixed well. The diameter of the anchor bolt, measured over the lugs, corresponds approximately to the diameter of the drilled hole, so that all of the compound mass, including the aggregates and splinters of glass from the capsule, are pressed through the spaces between the lugs. Rotary movement to mix the components is no longer necessary, so that the anchor bolt can be set in position by impact mounting using a hammer.

In accordance with a further feature of the present invention an even better mixing of the compound mass can be effected by arranging the lugs so that they are offset axially with respect to one another, so that a subsequent lug is aligned in each case with the gap formed by two preceding lugs. Depending on the viscosity of the compound mass on the one hand and on the particle size of the aggregates on the other hand, the spacings between adjacent lugs and successive lugs are varied. When using customary compound masses, it is advantageous to select the spacings and the lug height so that they correspond approximately to the width of the lug. The area of the gap for passage of the compound mass between two lugs thus corresponds approximately to the cross-sectional area of the subsequent lug and the lug aligned with the gap.

A still further feature of the present invention is that to reduce the resistance to driving-in, it is furthermore useful for the leading end face of the lugs to be in the form of a tapered point.

In accordance with the present invention the mixing attachment can be connected to the anchor bolt so that it is resistant to pull or is detachable in the direction of pull. The pull-resistant connection with the anchor bolt is especially advantageous when the anchor bolt is to be anchored in a zone subject to pressure. Since no cracks form in a zone subject to pressure, and thus no enlargement of the drilled hole occurs, there is also no axial displacement of the anchor bolt. Because of the pull-resistant connection between the mixing attachment and the anchor bolt, the mixing attachment forms an extension of the anchor bolt improving the load-bearing performance.

When anchor bolts constructed especially for use in a zone subject to tensile stress, a connection of the mixing attachment with the anchor bolt that is releasable in the pulling direction is recommended. Such a releasable connection can be achieved, for example, by means of a pin, by adhesive, or by a snap-in connection. The mixing attachment accordingly becomes detached from the anchor bolt in order, in the event of enlargement of the drilled hole as a result of cracks forming, to permit sliding up of the anchor bolt to achieve an expansion effect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
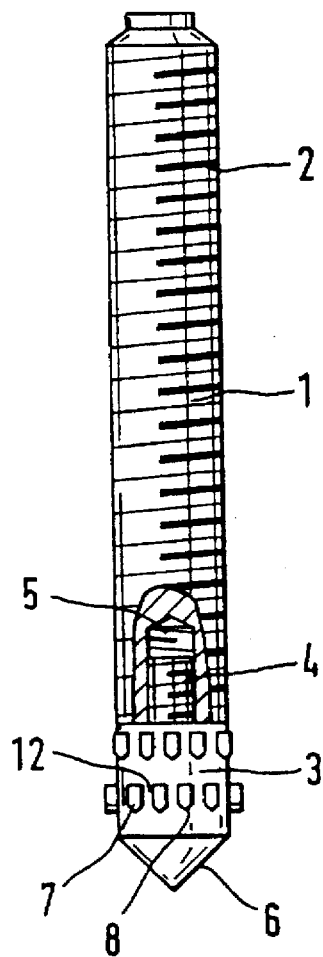
FIG. 1 is a view showing an anchor bolt in accordance with the present invention with a screwed-on mixing attachment.

The anchor bolt 1 in accordance with the invention as illustrated in FIG. 1 has a continuous external thread 2. On the one hand, as locking element, it offers anchoring resistance to tensile stress in the hardened compound mass, and on the other hand with its end projecting beyond the building component it enables an article to be fixed to the building component. A mixing attachment 3 is arranged at the leading end of the anchor bolt 1 and fixedly jointed to the anchor bolt by a threaded pin 4 in a corresponding threaded bore 5 of the anchor bolt 1. To facilitate entry into the drilled hole and to crush the glass capsule, the mixing attachment 3 has a cone-shaped tip 6 at its leading end. Radially projecting lugs 7 are arranged on the outer surface of the mixing attachment 3. They are arranged circumferentially and axially spaced from one another.

Figure 3:
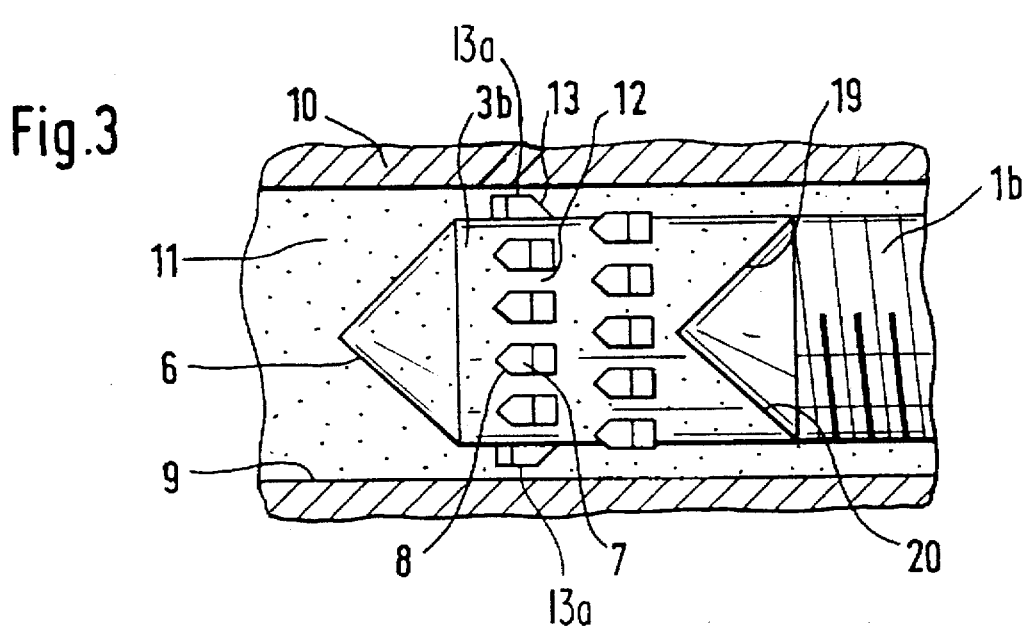
FIG. 3 is a view showing a mixing attachment adhesively secured to a wedge-shaped end face of the anchor bolt in accordance with the present invention.

The enlarged illustration shown in FIG. 3 shows that the leading end face of a lug 7 forms a tapered point 8. This tapered point reduces the driving-in resistance as the anchor bolt is driven into the hole 9 drilled in the building component 10. To improve mixing of the compound mass 11, it is advantageous for the lugs 7 to be arranged offset axially with respect to one another, so that a subsequent lug is aligned with the gap 12 formed by the two preceding lugs. In addition, the lugs 7 have a slope 13 declining axially towards the rear end. The upper surface 13a of each lug 7 is parallel to the longitudinal axis of the anchor bolt 1.

Figure 2:
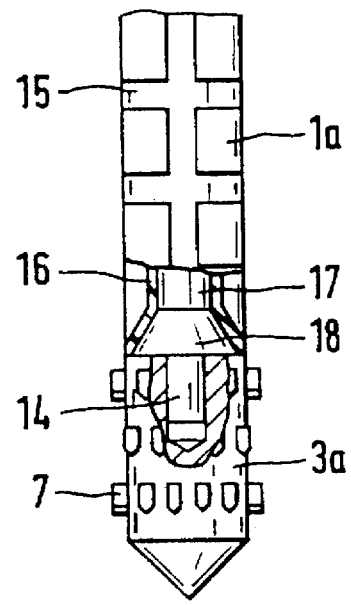
FIG. 2 is a view showing the mixing attachment joined to the anchor bolt by a pin coupling.

In the shown embodiment of the anchor bolt 1a illustrated in FIG. 2, the mixing attachment 3a is releasably connected to the anchor bolt by a pin 14 arranged at the leading end face of the anchor bolt 1a. The cone bolt 17 sheathed in a plastics coating 16 having grooves 15 can slide up subsequently in the event of enlargement of the drilled hole as a result of cracks forming, so that an expansion effect is achieved by means of the cone 18 of the cone bolt 17. The releasable pin coupling 14 now allows the axial displacement that is required for the anchor bolt 1a to be suitable for anchoring in a zone subject to tensile stress. The mixing attachment 3a remains bonded fixedly in the compound mass in the region of the bottom of the drilled hole by virtue of the lugs 7 arranged on its outer surface.

An adhesive connection 19 between the anchor bolt 1b and the mixing attachment 3b is illustrated in FIG. 3. Such a connection is used whenever a commercially available anchor bolt 1b already equipped with tapered surfaces 20 is to be provided with a mixing attachment 3b for impact mounting. Anchor bolts provided for mounting by rotary action can accordingly be converted for mounting by impact by subsequently attaching a mixing attachment by adhesion. The adhesive connection can also be used for an anchor bolt as shown in FIG. 2. In that case, the adhesion of the adhesive connection is adjusted so that on axial displacement of the anchor bolt 1a the adhesive connection breaks.

It will be understood that each of the elements described above, or two or more together, may also find a useful application in other types of constructions differing from the types described above.

While the invention has been illustrated and described as embodied in an anchor bolt for anchoring with compound mass, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchor bolt for anchoring with a compound mass in a hole drilled in a building component, the anchor bolt comprising a bolt element having a longitudinal axis, a leading end and a rear end; means for fixing an article at said rear end; and a mixing attachment arranged at said leading end of said bolt element and having a point, said mixing attachment having an outer surface provided with a plurality of radially projecting lugs which are arranged circumferentially and axially spaced from one another, said lugs having an upper surface which is parallel to the longitudinal axis of the bolt element and being arranged offset relative to one another, so that a subsequent one of said lugs is aligned with a gap formed by two preceding ones of said lugs; and means for connecting said mixing attachment to said bolt element so that said mixing attachment is detachable in direction of pull.

2. An anchor bolt as defined in claim 1, wherein said means for fixing an article is formed as a thread at the rear end of said bolt element.

3. An anchor bolt as defined in claim 1, wherein said lugs have a leading end face formed as a tapered point.

4. An anchor bolt as defined in claim 1, wherein said lugs have a slope declining axially toward said rear end.

5. An anchor bolt for anchoring with a compound mass in a hole drilled in a building component, the anchor bolt comprising a bolt element having a longitudinal axis, a lead end and a rear end; means for fixing an article at said rear end; and a mixing attachment arranged at said leading end of said bolt element, said mixing attachment arranged at said leading end of said bolt element, said mixing attachment having a cone-shaped tip for facilitating entry into the drilled hole and for crushing a glass capsule, said mixing attachment having an outer surface provided with a plurality of radially projecting lugs, each of said lugs being axially elongated and having an upper surface which is parallel to the longitudinal axis of the bolt element and a tapered point at a leading end for reducing a driving-resistance, said lugs being circumferentially and axially spaced from one another, and also offset relative to one another so that a subsequent one of said lugs is aligned with a gap formed by two preceding ones of said lugs; and means for connecting said mixing attachment to said bolt element so that said mixing attachment is detachable in direction of pull.

6. An anchor bolt for anchoring with a compound mass in a hole drilled in a building component, the anchor bolt comprising a bolt element having a longitudinal axis, a lead end and a rear end; means for fixing an article at said rear end; and a mixing attachment arranged at said leading end of said bolt element, said mixing attachment arranged at said leading end of said bolt element, said mixing attachment having a cone-shaped tip for facilitating entry into the drilled hole and for crushing a glass capsule, said mixing attachment having an outer surface provided with a plurality of radially projecting lugs, each of said lugs being axially elongated and having an upper surface which is parallel to the longitudinal axis of the bolt element and a tapered point at a leading end for reducing a driving-resistance, said lugs being circumferentially and axially spaced from one another, and also offset relative to one another so that a subsequent one of said lugs is aligned with a gap formed by two preceding ones of said lugs, said anchor bolt being provided with a releasable coupling pin which is frictionally received in a bore of said mixing attachment so that said mixing attachment is detachable in direction of pull.

* * * * *